United States Patent [19]
Soh

[11] Patent Number: 6,054,777
[45] Date of Patent: Apr. 25, 2000

[54] STARTER HAVING BRUSH DISPLACEABLE TO AND FROM COMMUTATOR

[75] Inventor: Masahiro Soh, Anjo, Japan

[73] Assignee: Denso Corporation, Kariya, Japan

[21] Appl. No.: 08/859,111

[22] Filed: May 20, 1997

[30] Foreign Application Priority Data

May 20, 1996 [JP] Japan ................................. 8-124786

[51] Int. Cl.⁷ ........................................ F02N 11/00
[52] U.S. Cl. ........................ 290/38 R; 290/46; 310/240
[58] Field of Search ........................ 290/38 R, 38 A, 290/46, 47, 48; 310/240, 229, 230, 231, 248; 74/6

[56] References Cited

U.S. PATENT DOCUMENTS

| | | |
|---|---|---|
| 1,764,709 | 6/1930 | Anderson . |
| 1,958,633 | 5/1934 | Miles ........................................ 171/324 |
| 2,295,289 | 9/1942 | Nardone ................................... 290/38 |
| 2,324,156 | 7/1943 | Heintz et al. ........................... 171/324 |
| 2,349,867 | 5/1944 | Heintz ...................................... 290/38 |
| 3,278,777 | 10/1966 | Grooms ................................. 310/240 |

FOREIGN PATENT DOCUMENTS

| | | |
|---|---|---|
| 56-107957 | 8/1981 | Japan . |
| 59-144355 | 8/1984 | Japan . |
| 61-155657 | 8/1986 | Japan . |

*Primary Examiner*—Nicholas Ponomarenko
*Attorney, Agent, or Firm*—Pillsbury Madison & Sutro LLP

[57] ABSTRACT

A positive-side brush and a negative-side brush are held by a motor frame and contact the sliding-contact surface of a commutator. A displacement member switches the state of one brush connected with a starting power source from an ON state in which the brush contacts the commutator to an OFF state in which the brush is separated from the commutator or vice versa. The displacement member comprises a slide rail holding the brush movably, a return spring which returns the brush to the OFF state, and a push button which is manually operated to press the brush against the commutator so as to turn on the brush. A starting electric circuit can be opened or closed by operating the push button.

14 Claims, 11 Drawing Sheets

STARTER HAVING BRUSH DISPLACEABLE TO AND FROM COMMUTATOR

CROSS REFERENCE TO RELATED APPLICATION

This application is based on and claims priority of Japanese Patent Application No. 8-124786 filed on May 20, 1997, the content of which is incorporated herein by reference.

BACKGROUND OF THE INVENTION

1. Field of the Invention

The present invention generally relates to a starter for starting an internal combustion engine with the driving force of a starter motor, and more particularly, to a starter preferably used to start a general-purpose engine.

2. Description of Related Art

A starter having no electromagnetic switch is disclosed in Japanese Utility Model Publication No. 56-10957. Such a starter has been used to start a general-purpose engine for driving a compact electric generator. Frequently, the general-purpose engine is not covered with a protection cover. Thus, the starter and its electric connecting wires are uncovered.

In most of such conventional starters for general-purpose engines, even though it is not provided with an electromagnetic switch, a switch having a large electric capacity is provided outside a motor frame accommodating the starter because a key switch of a car is short of current capacity. For example, as shown in FIG. 13A, frequently, a starter S having a starter motor M is driven by a battery B through a main electromagnetic switch 300 having a large electric capacity and a key switch 301 having a small electric capacity. Alternatively, as shown in FIG. 13B, a switch 302 having a large capacity is provided to drive a starter S.

Although the conventional starter S is not provided therein with a switch having a large capacity and is hence inexpensive, it is necessary to provide an external starting electric circuit including a starting power source (battery B) with an electromagnetic switch 300 or a switch 302 having a large capacity. Therefore, the conventional engine-starting system including the battery B and the starter S is still expensive.

SUMMARY OF THE INVENTION

It is accordingly an object of the present invention is to provide a starter for use in an inexpensive engine-starting system.

According to the present invention, a plurality of brushes which contact a commutator are held by a motor frame. A displacement member displaces the position of at least one of the brushes from a position at which the the brush is in contact with the commutator to a position at which the brush separates from the commutator by a predetermined distance. That is, one of the brushes is capable of selectively taking a state in which it is conductive with the commutator and a state in which it is nonconductive therewith. The brush which is brought into contact with the commutator or separated therefrom by the displacement member is hereinafter referred to as a switching brush.

The displacement member brings the switching brush into contact using the commutator with a predetermined biasing force. When the switching brush is electrically conductive with the commutator, a starting circuit is closed. As a result, starting electric current flows through the armature of a starter motor to rotate the armature. That is, electric power supplied from a starting power source is supplied to the armature through the switching brush and the commutator.

When the switching brush is electrically disconnected from the commutator by separating the switching brush from the commutator by a predetermined distance, the starting circuit is opened to disable rotation of the armature.

Accordingly, in the starter, the displacement member and the switching brush open and close the starting circuit. Thus, the starting electrical system using such a starter eliminates the need for the provision of expensive electric circuit elements such as an electromagnetic switch or a switch having a large electric capacity. That is, the actuation and stopping of the starter connected with the starting power source, consisting of a battery, can be accomplished without the need for a large capacity switch outside a motor frame. Consequently, it is not necessary to provide the starter with auxiliary wiring for exciting the coil of the electromagnetic switch.

The switching brush may be electrically connected with a negative electrode or a positive electrode of the power source. That is, the switching brush may be conductive with one electrode of the power source by means of an electric cable or with the other electrode thereof through the motor frame serving as the electrical ground.

Preferably, the displacement member comprises a slide rail, a return spring, and an external force-receiving portion. The slide rail is fixed to the motor frame and movably holds the switching brush.

Accordingly, when an external force is applied to the external force-receiving portion, the switching brush is pressed downward through the external force-receiving portion, thus moving downward along the slide rail against the biasing force of the return spring and contacting the commutator. As a result, the switching brush becomes electrically conductive with the commutator to drive the starter. When the external force is removed from the external force-receiving portion, the switching brush is moved upward by the return spring along the slide rail.

More preferably, the displacement member comprises a brush-interlocking portion and a biasing spring in addition to the slide rail, the return spring, and the external force-receiving portion. The brush-interlocking portion is partly connected with the switching brush and interlocked therewith. When the external force is not applied to the external force-receiving portion, the biasing force of the biasing spring which presses the brush-interlocking portion downward toward the commutator is smaller than that of the return spring which presses the brush-interlocking portion upward.

Accordingly, when the external force is not applied to the external force-receiving portion, the biasing force of the return spring is greater than that of the biasing spring. Thus, the brush-interlocking portion is moved upward by the return spring. At this time, because the brush-interlocking portion is interlocked with the switching brush, the switching brush separates from the commutator and moves upward, thus becoming nonconductive with the commutator.

When the external force is applied to the external force-receiving portion, the addition of the biasing force of the biasing spring and the external force applied to the external force-receiving portion exceeds the biasing force of the return spring, thus shifting the external force-receiving portion by a predetermined distance. As a result, the biasing spring whose upper end is in contact with the external force-receiving portion urges the brush-interlocking portion. Because the brush-interlocking portion is interlocked with the switching brush, the biasing spring moves the switching brush downward, thus biasing it against the commutator with a predetermined force. As a result, the switching brush becomes conductive with the commutator, which leads to the actuation of the starter. The external force applied to the external force-receiving portion is not directly applied to the commutator, but the resilient force of the biasing spring is applied thereto. Accordingly, the degree of force to be applied to the commutator does not exceed a predetermined range.

That is, when a force greater than the predetermined degree of force is applied to the external force-receiving portion, the degree of the biasing force to be applied to the commutator by the switching brush when both contact each other falls within an appropriate degree of force. Therefore, the starter provides the following advantages. The output of the output shaft can be prevented from being reduced by a frictional torque. The sliding-contact surface of the switching brush and that of the commutator can be prevented from excessive wear and the switching brush and the displacement member can be prevented from being greatly deformed or destroyed.

Accordingly, the switching brush is pressed against a commutator within the predetermined range of force. Thus, even though an excess degree of force is applied to the external force-receiving portion, there is no inconvenience in using the starter. When the external force is applied to the displacement member manually, vibrations generated on the sliding-contact surface of the switching brush when it has contacted the commutator is not transmitted to an operator through the external force-receiving portion.

Alternatively, the displacement member comprises an external force-receiving portion and a leaf spring. Thus, the displacement member has a construction simpler than that comprising the slide rail.

Alternatively, when an electromagnetic coil is energized with electric current, a movable iron core is attracted to the electromagnetic coil, thus biasing the switching brush against the commutator and allowing the switching brush to be conductive with the commutator. To the contrary, when the electromagnetic coil is not energized with electric current, the movable iron core is returned to the original position by the resilient force of the return spring. As a result, the switching brush separates from the commutator, thus being nonconductive therewith.

That is, the displacement member has a comparatively simple construction, but does not require the provision of a main switch. Further, the starter can be driven and stopped not manually but by a remote control, using a key switch even though it is used in an environment to which it is difficult for the operator to approach.

Further, it is possible to assemble, from many same parts, a starter in which a switching operation is manually performed and a starter in which a switching operation is electrically operated by designing them, using the same specification. Similarly, the displacement member of one starter in which a switching operation is manually performed can be replaced with the displacement member of the other starter in which a switching operation is electromagnetically performed to modify the former starter into the latter starter.

BRIEF DESCRIPTION OF THE DRAWINGS

Other objects, features and advantages of the present invention will become more apparent from the following detailed description when read with reference to the accompanying drawings, in which.

DETAILED DESCRIPTION OF THE PRESENTLY PREFERRED EMBODIMENTS

Figure 1:
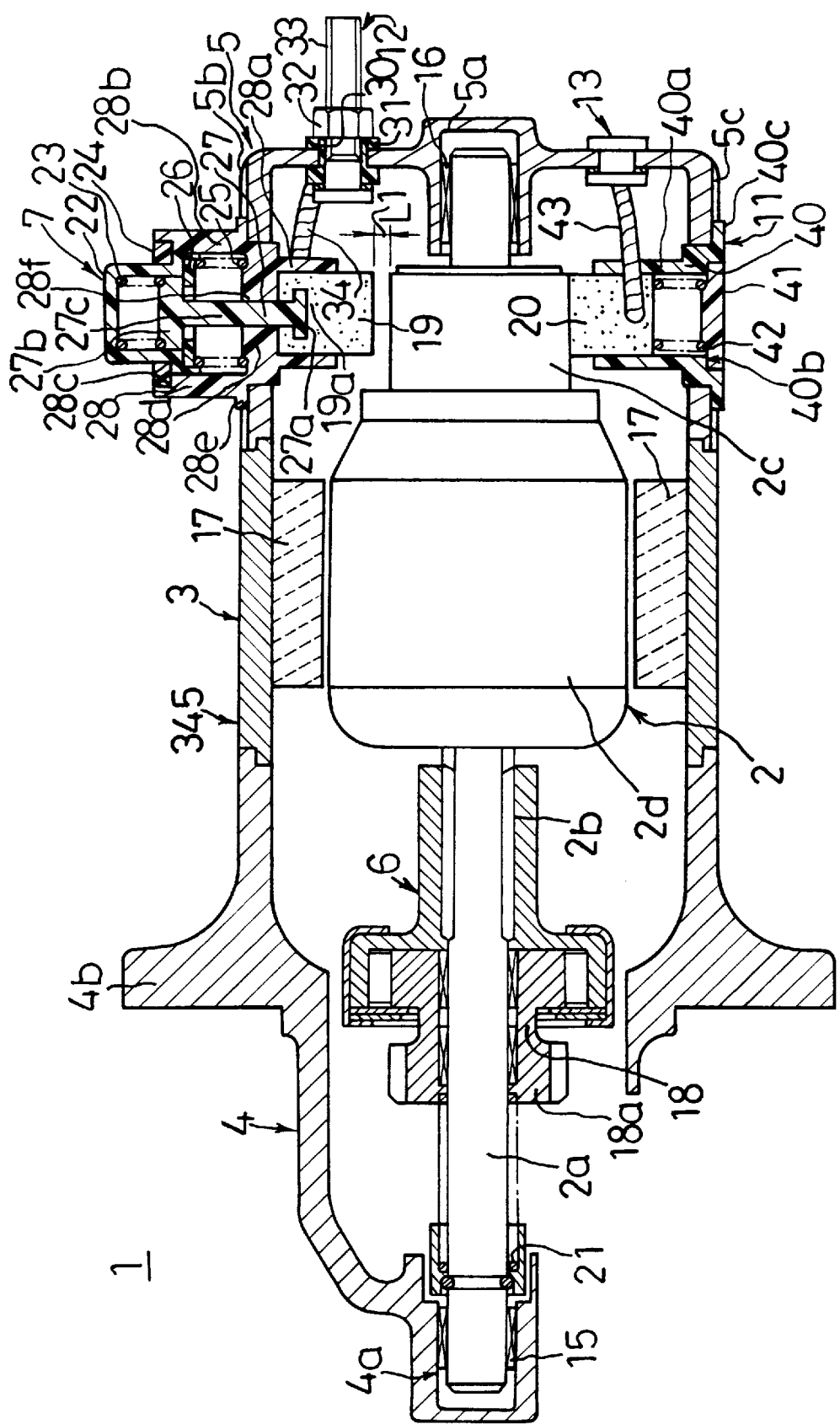
FIG. 1 is a sectional side view showing a starter according to a first embodiment of the invention.

A starter according to the present invention will be described below with reference to embodiments. The left-hand side in the drawings corresponds to the front side of a starter. The left end corresponds to the front end of the starter and the right end corresponds to the rear end of the same.

First Embodiment

As shown in FIG. 1, a starter 1 of the first embodiment comprises a motor frame 345 constituting the outer configuration of the starter 1 and its main construction, a motor rotor (armature) 2 rotatably accommodated in the motor frame 345 and other members. The armature 2 accommodated in the motor frame 345 is rotatably supported by both ends of an armature shaft 2a (output shaft) and has a commutator 2c at one end thereof in its axial direction.

The motor frame 345 accommodates brushes 19 and 20. The brush 20 is held constantly in contact with a sliding-contact surface of the commutator 2c, whereas the brush 19 is held radially displaceably to and from the sliding-contact surface of the commutator 2c by an operation which is performed outside the motor frame 345. The brush 19 is connected with a starting power source through an unshown external circuit connected therewith and a battery terminal 12, whereas the brush 20 is electrically coupled to with the motor frame 345 through a grounding rivet 13 and connected with an unshown ground side external circuit connected with the starting power source.

The motor frame 345 comprises a housing 4 located at the left-hand side in FIG. 1, an end frame 5 located at the right-hand side in FIG. 1 and a yoke 3 located intermediate between the housing 4 and the end frame 5. The motor frame 345 accommodates the armature 2 and other members. The housing 4 has a mounting portion 4b projecting axially outward from its peripheral surface at an intermediate position thereof. The mounting portion 4b is mounted on an unshown engine for installing the starter 1 thereon. The yoke 3 is made of a pipe-shaped soft magnetic material. Permanent field magnets 17 are fixed to the inner peripheral surface of the yoke 3. The end frame 5 constituting the rear part of the starter 1 is made of a strength-increased bowl-shaped cast metal, thus fixedly sandwiching the yoke 3 together with the housing 4.

A bearing 15 is mounted on the housing 4 by fitting the bearing 15 into the front end 4a thereof, whereas a bearing 16 is mounted on the end frame 5 by fitting the bearing 16 into its end frame 5 at the radial center. As described previously, the armature 2 accommodated in the motor frame 345 is rotatably supported by both ends of the armature shaft 2a through the front and rear bearings 15 and 16.

In front of a part 2d of the armature 2, including a coil and an iron core, there are provided a one-way clutch 6, a pinion moving member 18, the front part of which includes a pinion gear 18a, and a return spring 21 such that the armature shaft 2a is coaxial with the one-way clutch 6, pinion moving member 18, and the return spring 21. A helical spline 2b is formed on the peripheral surface of the armature shaft 2a. The helical spline 2b engages the inner peripheral surface of the clutch 6.

In this construction, when the armature 2 starts to rotate, a propulsive force acts on the clutch 6. Consequently, the pinion gear 18a moves forward with the clutch 6, thus engaging an unshown ring gear of the engine. As a result, the engine starts. To the contrary, when a torque does not act on the armature 2, the return spring 21 presses the pinion moving member 18 and the clutch 6, thus moving those backward to the original position, respectively.

Figure 2:
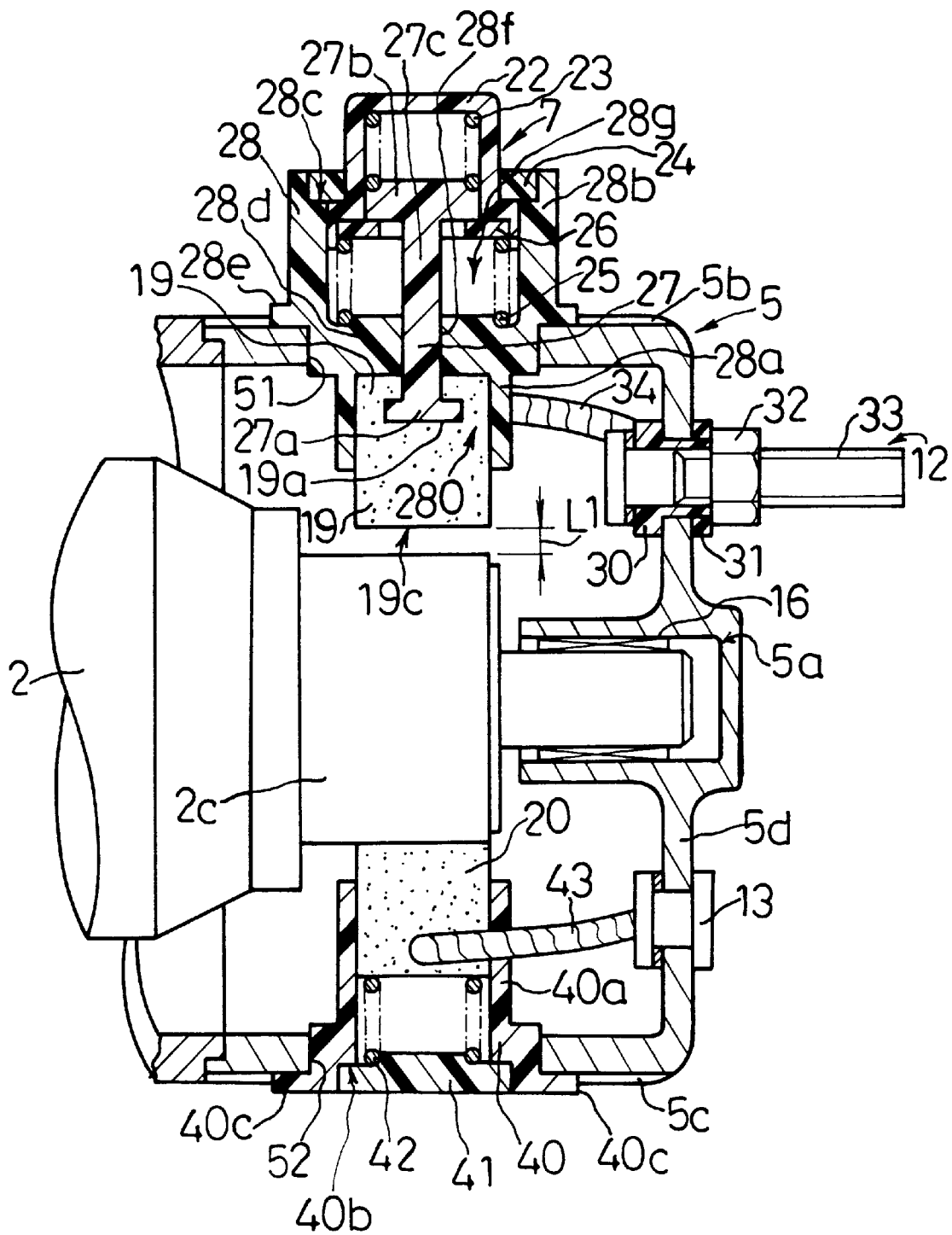
FIG. 2 is a sectional side view showing main parts of the starter according to the first embodiment in an OFF state.

As shown in FIGS. 1 and 2, the brushes 19 and 20 are held on the end frame 5. When the starter 1 is driven, electric current flows from the brush 19 to the brush 20 through the commutator 2c and an unshown electromagnetic coil.

The brush 20 is held by an electrically-insulating brush-holding member 40 fixed to the end frame 5 and electrically conductive with the end frame 5 through a cord 43 and the grounding rivet 13.

The brush-holding member 40 made of a synthetic resin formed by monolithic molding comprises a brush-accommodating portion 40a, a stepped open portion 40b, and a guide portion 40c. A rectangular hole formed inside the brush-accommodating portion 40a accommodates a spring 42. In the rectangular hole, the brush 20 rectangular in section is placed on the spring 42 so that the spring 42 urges the brush 20 radially inward, thus bringing it into contact with the commutator 2c. The stepped open portion 40b is fitted in a brush-mounting through-hole 52 formed at the lower wall of the end frame 5, thus fixing the brush-holding member 40 to the end frame 5. A stepped opening which is open downward is formed at the lower side of the stepped open portion 40b and closed with a cover member 41 fixedly inserted upward into the stepped open portion 40b. The guide portion 40c is rectangular and projects from the front and rear of the brush-holding member 40.

The brush-holding member 40 is fixedly inserted into the brush-mounting through-hole 52 formed at the lower wall of the end frame 5. Because the guide portion 40c engages an engaging groove 5c formed symmetrically on the lower wall of the end frame 5, the brush-holding member 40 is fixed to the predetermined position of the stepped open portion 40b.

The brush 19 is connected with an external circuit through a cord 34 and the battery terminal 12 which is connectable to an unshown battery, thus being electrically conductive with the positive electrode of the battery through the external circuit. The electrically conductive part of the battery terminal 12 comprises a terminal bolt 33 connected with one end of the cord 34 and a nut 32 engaging the terminal bolt 33. The terminal bolt 33 is fixed to the end frame 5 by the nut 32, with the front part thereof penetrating into a through-hole formed on a disc part 5d of the end frame 5 and the remaining part thereof located outside from the rear end surface of the end frame 5. The terminal bolt 33 and the nut 32 are insulated from the end frame 5 by a hollow insulation washer 30 inserted into the through-hole formed on the disc part 5d and by an insulation bolt 31 engaging the insulation washer 30.

The brush 19 is held by a hand-operated displacement member 7 mounted on the end frame 5. The brush (switching brush) 19 serving as a switch is pressed radially against the commutator 2c and separated radially therefrom when the displacement member 7 is operated. That is, the starter 1 has the displacement member 7 which switches the state of the brush 19 from a state in which the brush 19 is in contact with the commutator 2c at a predetermined force so that it becomes electrically conductive therewith to a state in which the brush 19 is separated from the commutator 2c by a predetermined distance L1 so that it becomes not electrically conductive therewith or vice versa.

Figure 4:
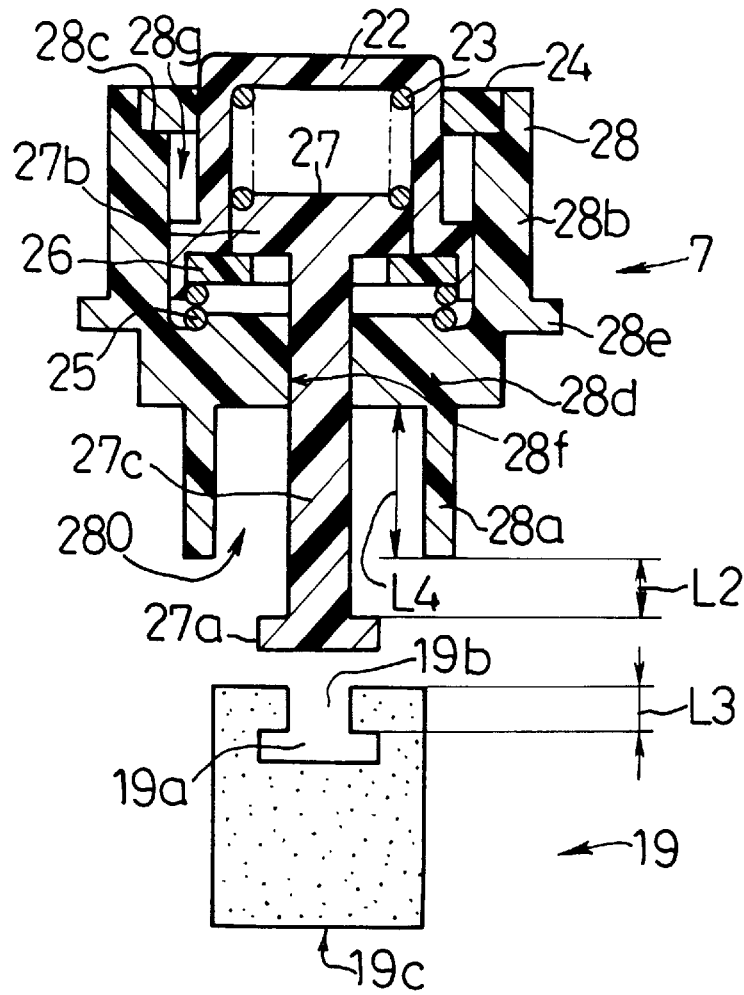
FIG. 4 is a sectional side view showing a displacement member and that of a brush according to the first embodiment.

As shown in FIGS. 2 and 4, the displacement member 7 comprises an electrically-insulating brush-holding member 28 holding the brush 19 displaceably by means of a slide rail, a return spring 25 and a push button 22 serving as an external force-receiving member. The displacement member 7 further comprises a circular rod-shaped member 27 serving as a brush-interlocking member, a biasing spring 23, and insulation washers 24 and 26.

When the brush-holding member 28 and the rod-shaped member 27 have insulation properties, the push button 22, the springs 23 and 25, and the washers 24 and 26 are not necessarily made of a material having insulation properties.

Figure 5:
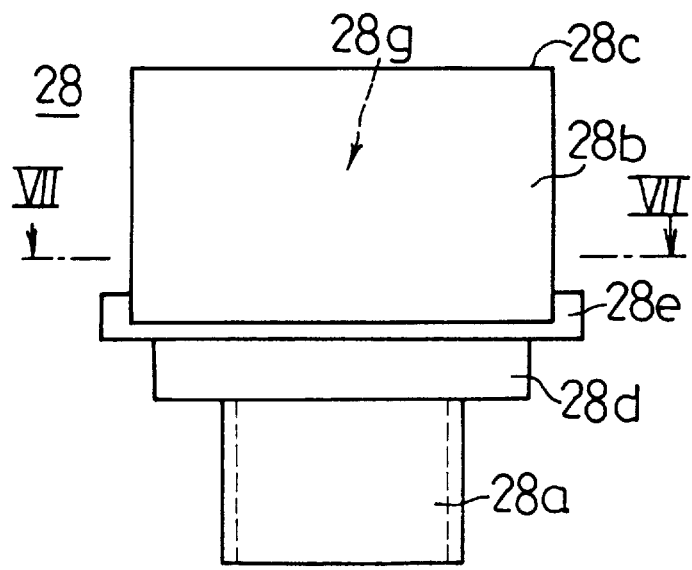
FIG. 5 is a side view showing a brush-holding member according to the first embodiment.
Figure 7:
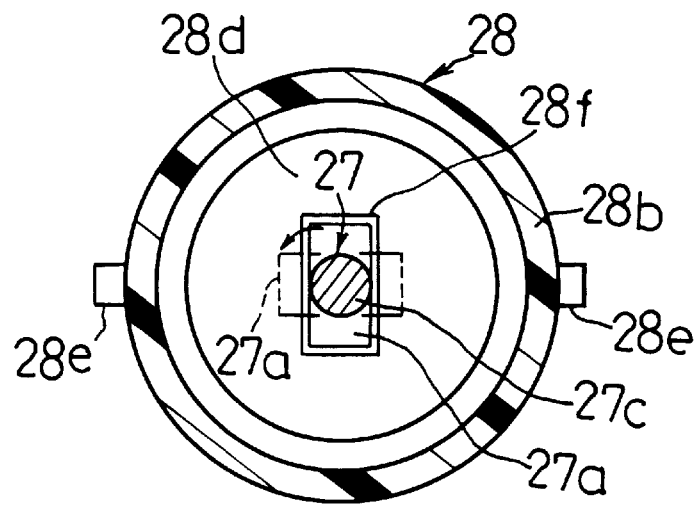
FIG. 7 is a horizontal sectional view showing a rod-shaped member and the brush-holding member according to the first embodiment.

The brush-holding member 28 fixed to the end frame 5 is a one-piece member formed by monolithic forming and having insulation property. As shown in FIGS. 4 and 5, the brush-holding member 28 comprises a brush-accommodating portion 28a, a cylindrical portion 28b, a stepped portion 28c, a bottom portion 28d, and a guide portion 28e. As shown in FIG. 7, a rectangular through-hole 28f formed at the center of the bottom portion 28d extends along the axis of the brush-holding member 28.

As shown in FIGS. 1 and 4, the brush-accommodating portion (slide rail) 28a has a rectangular hole 280 rectangular in a horizontal sectional view to accommodate the brush 19. The inner peripheral surface of the rectangular hole 280 is used as the slide rail which holds the brush 19 so that the brush 19 is movable toward the commutator 2c or away therefrom in a predetermined range L1. The rectangular hole 280 of the brush-accommodating portion 28a accommodates the brush 19 rectangular in section inserted thereinto upward from the lower side (the commutator side) thereof.

The bottom portion 28d is fixedly fitted into a mounting through-hole 51 (FIG. 2) formed at the upper wall of the end frame 5, thus fixing the brush-holding member 28 to the end frame 5. The hollow cylindrical portion 28b extends radially outwardly from the periphery of the bottom portion 28d. The inner periphery of the cylindrical portion 28b forms a blind hole 28g circular in a horizontal sectional view and open upward.

As shown in FIG. 4, the blind hole 28g accommodates the return spring 25, the washer 26, the circular rod-shaped member 27 made of an insulation resinous material and serving as a brush-interlocking member, the biasing spring 23, and the push button 22. The upper end portion of the cylindrical portion 28b of the inner peripheral surface of the blind hole 28g is stepped to form the stepped portion 28c. The washer 24 is fixedly inserted downward into the stepped portion 28c. The washer 24 prevents the upward movement of the push button 22.

The guide portion 28e is rectangular in section and projects from the front and rear of the brush-holding member 28. In mounting the displacement member 7 on the end frame 5, the guide portion 28e engages an engaging groove 5b (FIGS. 1 and 2) formed symmetrically on the upper wall of the end frame 5, thus allowing the displacement member 7 to be fixed to the end frame 5 at the predetermined position and direction.

Through the washer 26 and the rod-shaped member 27, the return spring 25 urges the brush 19 in the radially inward direction in which the brush 19 is separated from the commutator 2c, along the inner peripheral surface (slide rail) of the brush-accommodating portion 28a.

The rod-shaped member 27 which is a one-piece member having insulation property comprises an engaging projection 27a in an inverted T-shape in a side view and positioned at the lower end thereof, a disc-shaped piston portion 27b positioned at the upper end thereof, and a cylindrical bar portion 27c connecting the engaging projection 27a and the piston portion 27b with each other. At the upper part of the brush 19 facing the commutator 2c, there are formed an engaging concave portion 19a forming an internal space and an open portion 19b positioned above the center of the engaging concave portion 19a. The engaging projection 27a positioned at the lower end of the rod-shaped member 27 is engagedly inserted into the engaging concave portion 19a of the brush 19 from one side thereof, thus being interlocked with the brush 19.

The upper end of the biasing spring 23 is in contact with the inner (lower) side of the head of the push button 22, whereas the lower end thereof is in contact with the upper end surface of the piston portion 27b of the rod-shaped member 27. When the push button 22 is depressed by an operator to the position shown in FIG. 3, the biasing spring 23 presses the rod-shaped member 27 at its lower end, thus biasing the brush 19 against the commutator 2c through the rod-shaped member 27. The biasing force which is applied to the commutator 2c through the rod-shaped member 27 does not exceed the resilient force of the biasing spring 23. Thus, the brush 19 is pressed against the commutator 2c with a force within a predetermined range.

The reason is that when a reaction force applied to the brush 19 by the commutator 2c exceeds the resilient force of the biasing spring 23, the biasing spring 23 is contracted, with the result that the rod-shaped member 27 and the brush 19 move upward, thus relieving the biasing force which is applied from the brush 19 to the commutator 2c and that from the latter to the former.

The biasing force of the biasing spring 23 and that of the return spring 25 are so set that the biasing force of the biasing spring 23 is smaller than that of the return spring 25 in the state an external force is not applied to the push button 22. This is because if the biasing force of the biasing spring 23 is greater than that of the return spring 25, even in the state in which the push button 22 is not depressed, the brush 19 is moved downward to the commutator 2c.

The push button 22 having a horizontal wall at the upper end thereof is hollow cylindrical. Because the push button 22 is stepped at a lower end thereof such that the diameter of its lower end is a little greater than that of its other parts. The lower end part of the push button 22 is in sliding contact with the inner peripheral surface of the cylindrical portion 28b of the brush-holding member 28 to hold the push button 22 on the end frame 5 through the brush-holding member 28. Subjected to a predetermined downward force, the biasing spring 23 presses the rod-shaped member 27 at its lower end, thus biasing the brush 19 connected and interlocked with the rod-shaped member 27 against the commutator 2c through the rod-shaped member 27 with a force within the predetermined range.

The sizes required in the assembly of the displacement member 7 and the brush 19 include L1 shown in FIG. 2 and L2, L3, and L4 shown in FIG. 4. L1, L2, L3, and L4 are the sizes measured along the movement direction of the brush 19. That is, as shown in FIG. 2, the size L1 is the distance between the brush 19 and the commutator 2c. As shown in FIG. 4, the size L2 is the length of a portion of the connection bar portion 27c of the rod-shaped member 27 between the engaging projection 27a thereof and a point thereof corresponding to the lower end surface of the brush-accommodating portion 28a. The size L3 is the length of the open portion 19b of the brush 19 (length from the upper end of the open portion 19b to the upper end of the engaging concave portion 19a). The size L4 is the length of the rectangular hole 280 of the brush-accommodating portion 28a.

When the push button 22 is depressed fully as shown in FIG. 4, the length L2 is greater than the length L3 of the open portion 19b. That is, when the push button 22 is depressed fully, the brush 19 moves out completely from the brush-accommodating portion 28a of the brush-holding member 28. Therefore, the brush 19 can be removably installed on the rod-shaped member 27 without disassembling the displacement member 7, which facilitates the installation of the brush 19 on the rod-shaped member 27 in an assembling operation and the replacement of the brush 19 for maintenance.

Figure 3:
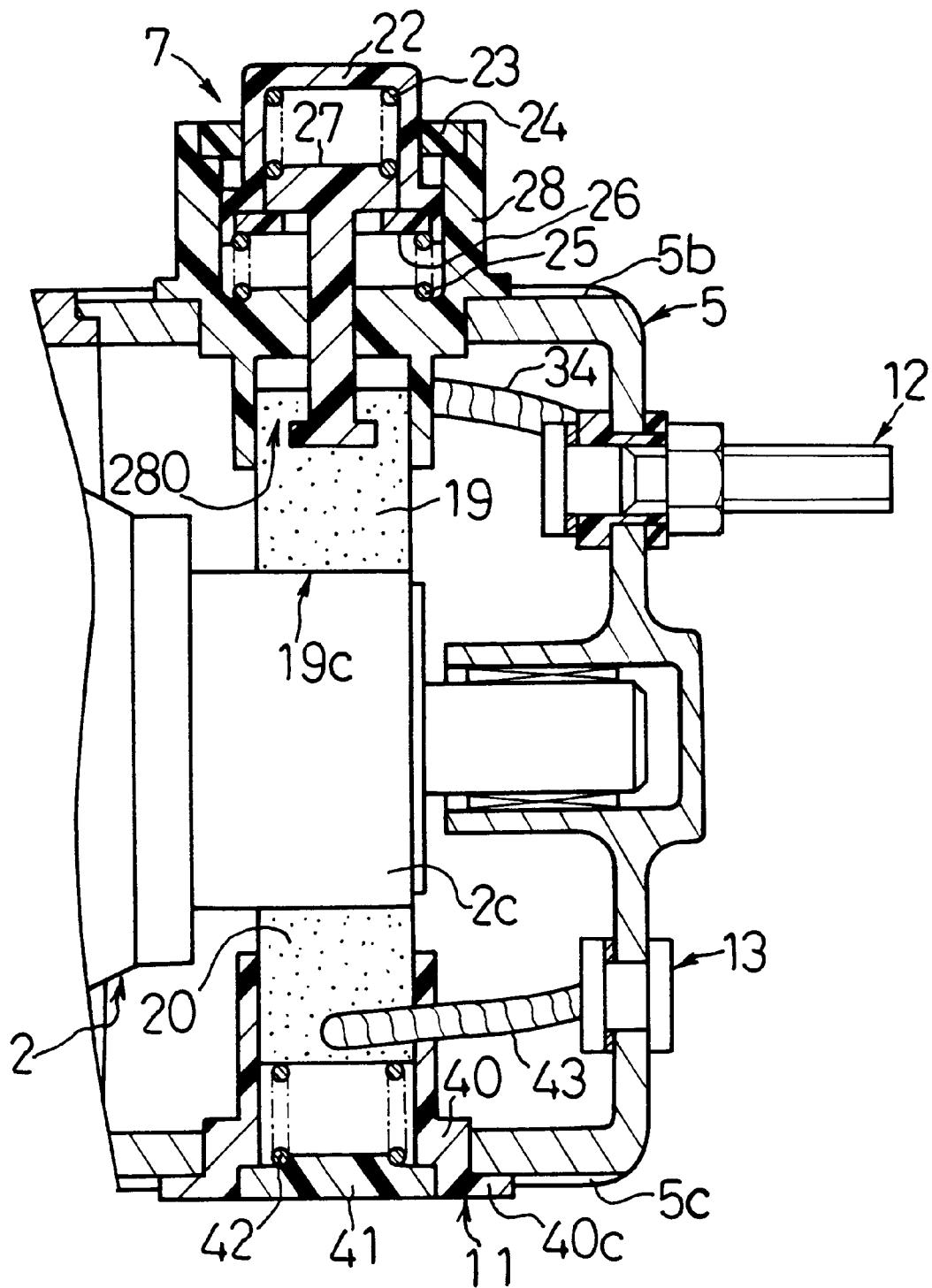
FIG. 3 is a sectional side view showing the main parts of the starter according to the first embodiment in an ON state.

The length L4 (FIG. 4) of the rectangular hole 280 of the brush-accommodating portion 28a is greater than the distance L1 (FIG. 2) by a predetermined length. Therefore, when the brush 19 projects downward from the brush-accommodating portion 28a of the brush-holding member 28 and contacts the commutator 2c in the state in which the starter 1 has been fully assembled, as shown in FIG. 3, there is no possibility that the brush 19 is removed from the brush-accommodating portion 28a. When the difference between the length L4 and the distance L1 is large, the brush 19 has a minimal degree of wear, thus having a long life.

Figure 6:
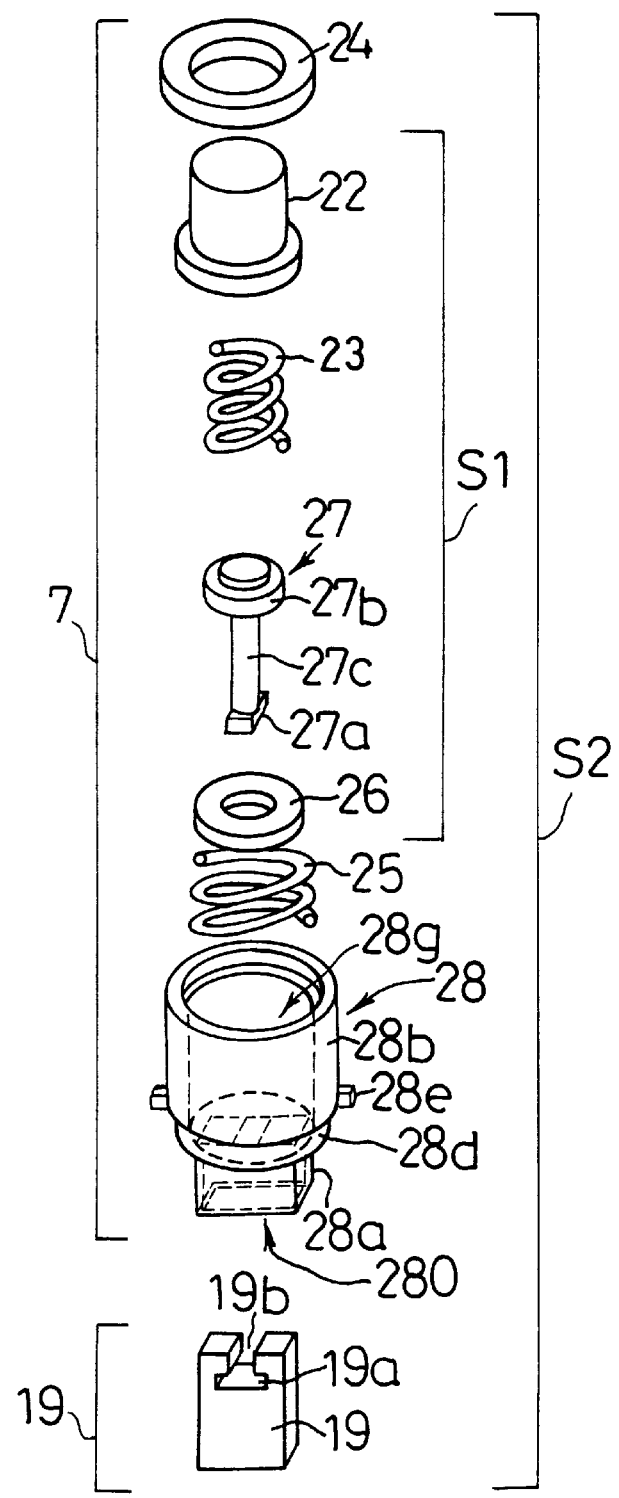
FIG. 6 is an exploded perspective view showing the displacement member and a brush according to the first embodiment.

In the assembly procedure of the displacement member 7, the washer 24, the push button 22, the return spring 25, the rod-shaped member 27, the washer 26, the return spring 25, and the brush-holding member 28 are placed one on the other in this order in the axial direction of the displacement member 7 and assembled as shown in FIG. 6.

That is, first, the biasing spring 23 is inserted into the push button 22 and then, the rod-shaped member 27 is inserted thereinto. Then, the washer 26 is fixedly pressed into the stepped open portion formed at the lower end of the push button 22. In this manner, a subassembly S1 including the push button 22, the biasing spring 23, the rod-shaped member 27, and the washer 26 is constructed.

Thereafter, the return spring 25 is inserted into the blind hole 28g formed of the cylindrical portion 28b of the brush-holding member 28 and then, the subassembly S1 is inserted downward thereinto and placed on the return spring 25. The rectangular engaging projection 27a of the rod-shaped member 27 is inserted into the rectangular through-hole 28f formed at the center of the bottom portion 28d of the brush-holding member 28 by adjusting the longer sides of the engaging projection 27a to those of the through-hole 28f and the shorter sides of the former to those of the latter, as shown by the solid line in FIG. 7. Because the engaging projection 27a is a little smaller than that of the rectangular through-hole 28f lengthwise and widthwise, the engaging projection 27a and a part of the connection bar portion 27c are inserted through the rectangular through-hole 28f, thus projecting into the rectangular hole 280 formed of the brush-accommodating portion 28a. After the engaging projection 27a passes through the rectangular through-hole 28f, the rod-shaped member 27 is rotated 90° on the axis of the brush-holding member 28 so that the longer side of the engaging projection 27a is parallel with the axial direction of the armature shaft 2a, namely, parallel with the front-to-back direction of the guide portion 28e, as shown by the broken line in FIG. 7. In this state, the engaging projection 27a is prevented from dropping from the rectangular through-hole 28f.

After the return spring 25 and the subassembly S1 are inserted into the blind hole 28g of the brush-holding member 28, the washer 26 is pressed into the stepped portion 28c at the upper end of the brush-holding member 28 to fix the return spring 25 and the subassembly S1. The upper half of the push button 22 is pressed by the return spring 25, thus projecting upward from the through-hole of the washer 26. In this manner, the assembly of the displacement member 7 is completed.

Then, the brush 19 is incorporated in the displacement member 7. At this time, as shown in FIG. 4, the push button 22 is depressed fully to project the engaging projection 27a of the rod-shaped member 27 downward from the lower end surface of the brush-accommodating portion 28a. At this time, the engaging projection 27a is projected downward therefrom by the distance L2. As described previously, the length L3 of the open portion 19b of the brush 19 is shorter than the distance L2. Therefore, the engaging projection 27a of the rod-shaped member 27 is inserted into the engaging concave portion 19a of the brush 19 along a direction perpendicular to the paper on which FIG. 4 has been drawn to fit the engaging projection 27a into the engaging concave portion 19a, without the brush-accommodating portion 28a interfering with the engaging projection 27a. With the elimination of an external force applied to the push button 22, the brush 19 in engagement with the rod-shaped member 27 is moved upward into the brush-accommodating portion 28a and held vertically movably.

In this manner, the assembly of the displacement member 7 holding the brush 19 is completed. The assembled unit consisting of the displacement member 7 and the brush 19 is hereinafter referred to as a subassembly S2 (FIG. 6.)

As shown in FIG. 2, the brush-accommodating portion 28a and the bottom portion 28d are inserted into the mounting through-hole 51 formed on the upper wall of the end frame 5. As a result, the bottom portion 28d is fitted into the mounting through-hole 51, thus fixing the subassembly S2 to the end frame 5. In assembling the subassembly S2, because the guide portion 28e of the brush-holding member 28 engages the engaging grooves 5b formed symmetrically on the upper wall of the end frame 5, not only the assembling position of the subassembly S2, but also the direction thereof can be accurately determined.

According to the starter 1 of the first embodiment, the following advantages will be provided.

Firstly, the starting electrical system including the starter 1 can be constituted at a low cost. Further, it is easy and does not take much time and labor to wire the starter for electricity. Thus, the starting electrical system including the starter 1 has a high reliability.

The brushes which contact the commutator 2c of the armature 2 include the brush 19 and the brush 20 which are held by the end frame 5 through the brush-holding members 28 and 40, respectively. The brush (switching brush) 19 serving as a switch is electrically conductive (ON) with the commutator 2c or not electrically conductive (OFF) therewith by the operation of the displacement member 7 as shown in FIG. 8.

The displacement member 7 brings the brush 19 into contact with the commutator 2c with a predetermined biasing force. When the brush 19 is electrically conductive (ON) with the commutator 2c, the starting circuit is closed. As a result, starting electric current flows through the armature 2. Consequently, the armature 2 starts to rotate. That is, an electric power supplied from a starting power source B is supplied to the armature 2 through the brush 19 and the commutator 2c. As a result, a magnetic torque is generated in the armature 2 and thus the armature 2 rotates, thereby generating an output for starting the unshown engine.

To the contrary, in the state in which the brush 19 is not electrically conductive (OFF) with the commutator 2c as a result of the separation of the brush 19 from the commutator 2c by the predetermined distance L1 from the commutator 2c, the starting circuit is opened. Therefore, a magnetic torque is not generated in the armature 2.

Figure 8:
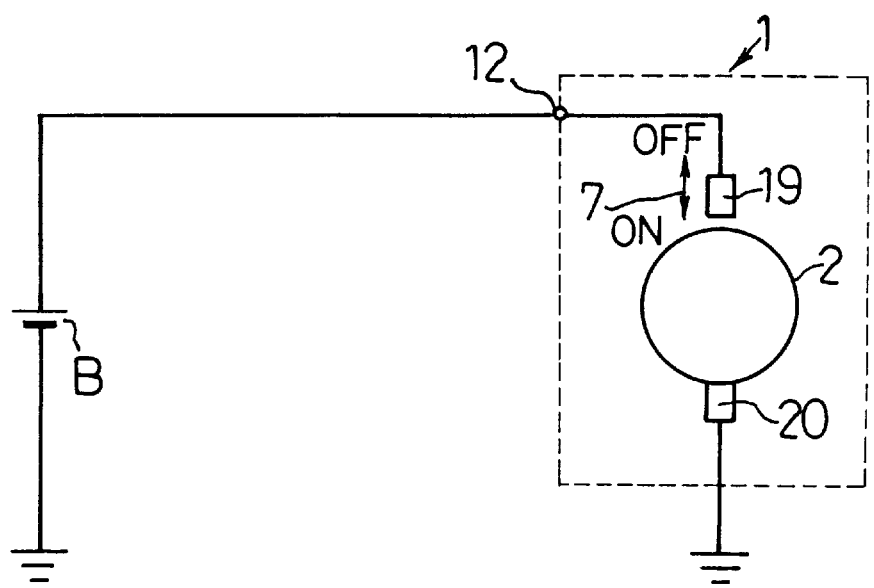
FIG. 8 is an electric circuit diagram of a starting system using the starter according to the first embodiment.

As shown in FIG. 8, in the starter 1, the displacement member 7 and the brush 19 open and close the starting circuit. Thus, the starting electrical system including the starter 1 eliminates the need for the provision of expensive electric circuit elements such as an electromagnetic switch and a switch having a large capacity.

The actuation and stop of the starter 1 connected with the starting power source consisting of the battery B can be accomplished without the need of a switch having a large capacity provided outside the motor frame. Consequently, the starting electrical system can be allowed to have a simple construction, and thus can be manufactured at a low cost. Further, it is not necessary to provide the starter 1 with auxiliary wiring for exciting the coil of the electromagnetic switch. Therefore, it is easy and does not take much time and labor to wire the starter 1 attached to a general-purpose engine for electricity in a factory. Further, the starter 1 has a simple construction and thus a small number of connectors so that the engine-starting system has high reliability. As described above, the displacement member 7 allows the engine-starting system to be constituted at a low cost, thus having high reliability.

Secondly, the displacement member 7 has a simple construction and thus can be manufactured easily and yet, allows the biasing force of the brush 19 to be applied to the commutator 2c to be kept in an appropriate range. Thus, the starter 1 has high reliability and a long life.

11

As shown in FIG. 2, the displacement member 7 of the starter 1 includes the brush-accommodating portion 28a serving as the slide rail and the push button 22 serving as the external force-receiving means. The brush-holding member 28 having the brush-accommodating portion 28a is fixed to the end frame 5 of the motor frame 345 and holds the brush 19 movably.

Referring to FIG. 3, when the push button 22 is depressed by the operator, the brush 19 moves downward along the inner peripheral surface of the brush-accommodating portion 28a against the biasing force of the return spring 25, thus contacting the commutator 2c. As a result, the brush 19 becomes electrically conductive with the commutator 2c and the starting circuit is closed at the sliding-contact surface of the brush 19 and that of the commutator 2c because the brush 20 is constantly conductive with the commutator 2c. Consequently, the starter 1 is actuated.

When the operator releases the push button 22, as shown in FIG. 2, the brush 19 is moved upward by the return spring 25 along the inner peripheral surface of the brush-accommodating portion 28a, thus being separated from the commutator 2c. As a result, the brush 19 becomes nonconductive with the commutator 2c. Thus, the starter 1 stops.

The displacement member 7 of the starter 1 further comprises the rod-shaped member 27 and the biasing spring 23. The rod-shaped member 27 is interlocked with the brush 19, with its engaging projection 27a positioned at its lower end in engagement with the engaging concave portion 19a formed at the upper part of the brush 19. In FIG. 2, when the operator releases the push button 22, the biasing force of the biasing spring 23 which presses the rod-shaped member 27 downward, namely, toward the commutator 2c is smaller than that of the return spring 25 which presses the rod-shaped member 27 upward. Accordingly, the return spring 25 presses the rod-shaped member 27 upward. At this time, because the rod-shaped member 27 is interlocked with the brush 19, the brush 19 separates from the commutator 2c and moves upward, thus becoming nonconductive with the commutator 2c to stop the starter 1.

To the contrary, when the push button 22 is depressed (ON) as shown in FIG. 3, i.e., when the operator applies a biasing force to the push button 22, the addition of the biasing force of the biasing spring 23 and the external force applied to the push button 22 exceeds the biasing force of the return spring 25. While the push button 22 is moving downward in the blind hole 28g of the brush-holding member 28, the biasing spring 23 whose upper end is in contact with the push button 22 and lower end is in contact with the rod-shaped member 27 urges the rod-shaped member 27 downward by its resilient force. Because the rod-shaped member 27 is interlocked with the brush 19, the biasing spring 23 moves the brush 19 downward, thus biasing it against the commutator 2c with a predetermined force. As a result, the brush 19 becomes conductive with the commutator 2c, which leads to the actuation of the starter 1. The external force applied to the push button 22 by the operator is not directly applied to the commutator 2c, but the resilient force of the biasing spring 23 is applied thereto. Accordingly, the degree of force to be applied to the commutator 2c does not exceed the predetermined one.

That is, when a force greater than the predetermined degree of force is applied to the push button 22, the degree of the biasing force to be applied to the commutator 2c by the brush 19 when both contact each other falls within an appropriate range of force. Therefore, the output of the armature shaft 2a can be prevented from being reduced by

12 a frictional torque, and the sliding-contact surface of the brush 19 and that of the commutator 2c can be prevented from being worn greatly. Further, the brush 19 and the displacement member 7 can be prevented from being deformed greatly or destroyed.

Accordingly, the displacement member 7 of the starter 1 of the first embodiment has a simple construction and yet high reliability. Moreover, the brush 19 is pressed against the commutator 2c within the predetermined degree of force. Thus, even though an excess force is applied to the push button 22, there is no inconvenience in using the starter 1. Thus, the starter 1 can be used with high reliability and has a long life.

Moreover, vibrations generated on the sliding-contact surface of the brush 19 when it has contacted the commutator 2c is not transmitted to the operator through the push button 22. Thus, the operator does not feel uncomfortable.

First Modification

Figure 9:
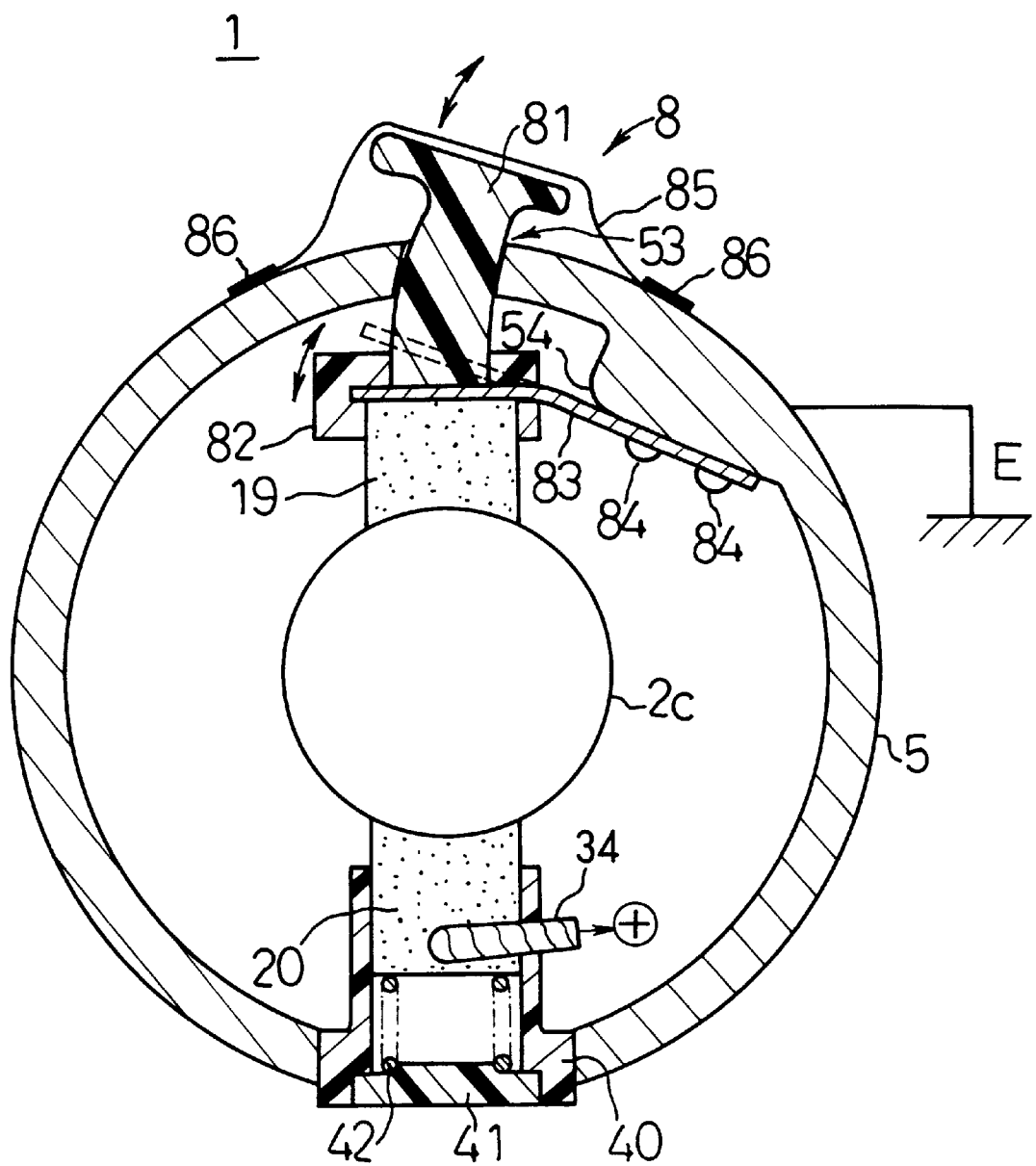
FIG. 9 is an end sectional view showing main parts of a starter according to a first modification of the first embodiment.

In this modification, the displacement member 7 of the starter 1 of the first embodiment is replaced by another type of a displacement member 8 as shown in FIG. 9. Further, the brush 19 is used as the negative side and the brush 20 is used as the positive side.

The end frame 5 made of a conductive metal material similar to that of the first embodiment holds the brush-holding member 40 fixed to the lower wall thereof. The brush-holding member 40 holds the brush 20 such that the brush 20 is perpendicular to the upper surface of the commutator 2c. The cover member 41 is fixed to the open portion of the brush-holding member 40 formed on the lower wall of the end frame 5. The brush-holding member 40 accommodates the spring 42 which is contracted when it is installed on the cover member 41, thus becoming elastic and constantly urging the brush 20 upward or radially inward. Consequently, the brush 20 is in contact with the commutator 2c constantly. The brush 20 is conductive with the positive electrode of the starting power source through the cord 34 and an unshown terminal bolt.

The end frame 5 holds the brush 19 at a position of the upper wall thereof through the displacement member 8 such that the brush 19 and the brush 20 face each other across the commutator 2c.

The displacement member 8 comprises a leaf spring 83, one end of which is fixed to the inner peripheral surface of the end frame 5, a push button 81 connected with the other end of the leaf spring 83 and projecting outside from a through-hole 53 of the end frame 5, and a connection member 82 holding the brush 19.

That is, one end of the leaf spring 83 is fixed, with a plurality of screws 84 to a mounting portion 54 projecting from the inner peripheral surface of the end frame 5. The other end of the leaf spring 83 is located across the through-hole 53. The connection member 82 connecting the push button 81 and the brush 19 with each other is held at the other end of the leaf spring 83.

The connection member 82 holds the push button 81 and the brush 19 thereon, with the lower end surface of the push button 81 in contact with one surface of the other end of the leaf spring 83 and with one surface of the brush 19, not facing the commutator 2c in contact with the other surface of the other end of the leaf spring 83. That is, the connection member 82 fixes the other end of the leaf spring 83, the push button 81, and the brush 19 to one another.

In this construction, when a predetermined force is applied to the push button 81 serving as an external force-receiving member, the brush 19 is urged in a direction in which it is pressed against the commutator 2c against the resilient force of the leaf spring 83. The push button 81 has an appropriate curvature so that the push button 81 slides in contact with the inner peripheral surface of the through-hole 53 smoothly. The leaf spring 83 which can be curved holds the brush 19 serving as a switch such that the brush 19 is movable in a direction substantially perpendicular to the sliding-contact surface of the commutator 2c. Therefore, the brush 19 contacts the commutator 2c when an external force is applied to the push button 81. As a result, a starting circuit is closed and starting electric current flows therethrough, thus actuating the starter 1. The starting circuit comprises an unshown starting power source, the unshown terminal bolt, the cord 34, the brush 20, the commutator 2c, the brush 19, the leaf spring 83, the end frame 5, and the ground E.

To the contrary, when the external force applied to the push button 81 is removed therefrom, the leaf spring 83 is elongated to the position shown by the broken line in FIG. 9 by the restoring force generated by the resiliency of the leaf spring 83. As a result, the brush 19 separates from the commutator 2c and becomes nonconductive therewith. Thus, the starter 1 is not driven.

Therefore, similarly to the first embodiment, the starter 1 is actuated when the operator presses the push button 81, whereas it is stopped when the operator releases the push button 81.

Thus, the displacement member 8 has a construction simpler than that of the displacement member 7 in the first embodiment, which includes the slide rail formed of the brush-holding member 28. Accordingly, this modification provides the starter highly reliable and much less expensive than that of the first embodiment and yet provides the advantage similar to that of the first embodiment.

The push button 81 is covered with a soft cover sheet 85 made of silicon rubber and joined with the peripheral surface of the end frame 5 at a sealing portion 86. Thus, the through-hole 53 is highly dust-proof and waterproof, thus preventing the operator from receiving an electrical shock.

Second Modification

In the second embodiment, a starter 1 is so constructed as to be kept driven even when the operator releases the push button 8.

Figure 10:
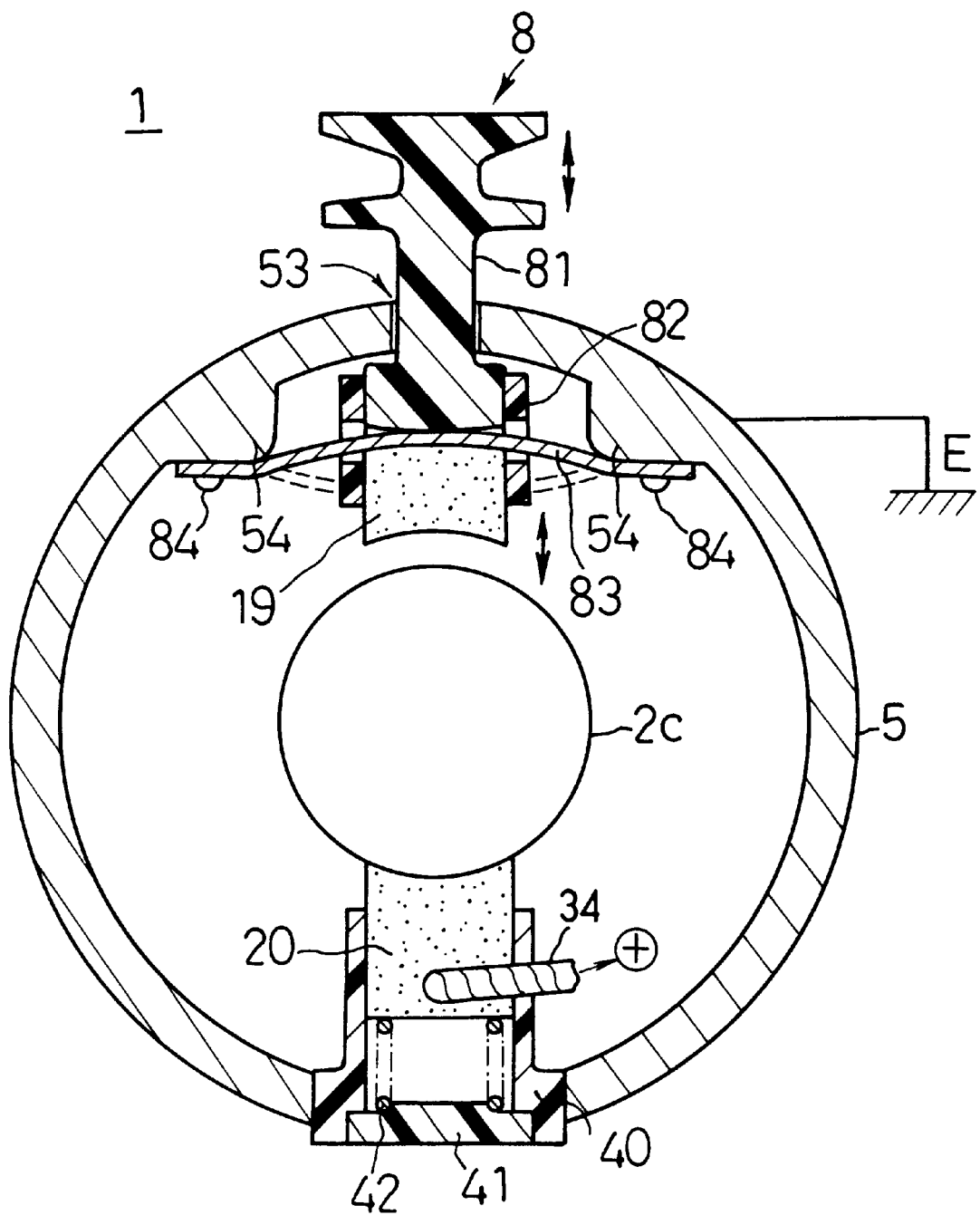
FIG. 10 is an end sectional view showing main parts of a starter according to a second modification of the first embodiment.

Referring to FIG. 10, the end frame 5 made of a conductive metal material holds the brush-holding member 40 fixed to the lower wall thereof. The end frame 5 holds the brush 19 at a position of the upper wall thereof through the displacement member 8 such that the brush 19 and the brush 20 face each other across the commutator 2c.

The displacement member 8 comprises a snap-action type leaf spring 83, both ends of which are fixed to inner peripheral surface of the end frame 5, a push-pull knob 81 connected with the center of the leaf spring 83 and projecting outside from a through-hole 53 of the end frame 5, and a connection member 82 holding the brush 19.

That is, both ends of the leaf spring 83 are fixed by a plurality of screws 84 to a pair of mounting portions 54 projecting from the inner peripheral surface of the end frame 5. The leaf spring 83 is subjected to a preliminary compression from the right-hand and left-hand sides thereof, thus being constantly flexed or buckled in the radially outward direction. The center part of the leaf spring 83 extends across the through-hole 53 of the end frame 5. The connection member 82 connecting the push-pull knob 81 and the brush 19 with each other is held at the center of the leaf spring 83.

The lower end surface of the push-pull knob 81 in contact with the leaf spring 83 and the upper end surface of the brush 19, in contact with the leaf spring 83 form a primary projected surface having an appropriate curvature, respectively. This is to prevent the leaf spring 83 from being deformed in the opposite direction after the leaf spring 83 is buckled in a direction, namely, upward or downward by a switching operation, i.e., when an external force is applied to the push-pull knob 81. In this manner, a great bending stress can be prevented from being applied to the leaf spring 83.

The connection member 82 holds the push-pull knob 81 and the brush 19 thereon, with the lower end surface of the push-pull knob 81 in contact with one surface of the other end of the leaf spring 83 and with one surface of the brush 19, not facing the commutator 2c in contact with the other surface of the other end of the leaf spring 83. That is, the connection member 82 fixes the center of the leaf spring 83, the push-pull knob 81, and the brush 19 to one another.

In this construction, when a predetermined force is axially applied to the push-pull knob 81 serving as an external force-receiving member, the brush 19 is pressed downward against the resilient force of the leaf spring 83. As a result, the leaf spring 83 is deformed downward beyond the point of equilibrium thereof which has been buckled upward, thus being buckled downward as shown with the broken line of FIG. 10. Consequently, the leaf spring 83 urges the brush 19 in the direction in which the brush 19 is pressed against the commutator 2c. The leaf spring 83 holds the brush 19 which can be deformed and serves as a switch so that the brush 19 is movable perpendicularly to the sliding-contact surface of the commutator 2c.

When the external force applied to the push-pull knob 81 is removed therefrom, the resilient force of the leaf spring 83 buckled downward keeps the brush 19 in contact with the commutator 2c. As a result, a starting circuit is maintained closed and the starter 1 is maintained actuated.

To the contrary, when an external force is applied to the push-pull knob 81 in the opposite direction, i.e., when it is pulled with the external force, the leaf spring 83 is buckled upward, thus returning to the original position as shown with the solid line in FIG. 10. That is, the brush 19 separates from the commutator 2c and becomes nonconductive therewith. Thus, the starter operation is stopped.

Therefore, the starter 1 is actuated when the operator presses the push-pull knob 81, whereas it is stopped when the operator pulls the push-pull knob 81. Further, the starter 1 or the motor can be kept driven once the push-pull knob 81 is depressed.

Thus, the displacement member 8 of this modification has a construction simpler than that of the displacement member 7 of the first embodiment, which comprises the slide rail formed of the brush-holding member 28. Accordingly, the second modification provides the starter highly reliable and much less expensive than that of the first embodiment and yet provides the advantage similar to that of the first embodiment and that of the first modification.

It is possible to install a dust-proof and waterproof sealing member in the vicinity of the sliding-contact surface of the end frame 5 and that of the push-pull knob 81. Thus, the through-hole 53 is allowed to be highly dust-proof and waterproof.

Further, each hole which is positioned at both ends of the leaf spring 83 and into which the screw 84 is inserted may have a play to replace the push-pull knob 81 with a push button. In this construction, when the push button is pressed, the center part of the leaf spring 83 is buckled downward, thus bringing the brush 19 into contact with the commutator 2c, similarly to the operation of the first embodiment and that of the first modification. When the operator releases the push button, the leaf spring 83 is buckled upward, thus returning to the original position. As a result, the brush 19 separates from the commutator 2c and becomes nonconductive therewith. Thus, the starter 1 is not driven.

Further Modification

As a further modification of the first embodiment and also of the first and second modifications, a starter in which a commutator is formed on the peripheral surface of a coil of the armature 2 may be used. In this modification, at least one of the brushes which slidably contacts the surface of the commutator is held by any one of the displacement member 7 or 8.

Second Embodiment

Figure 11:
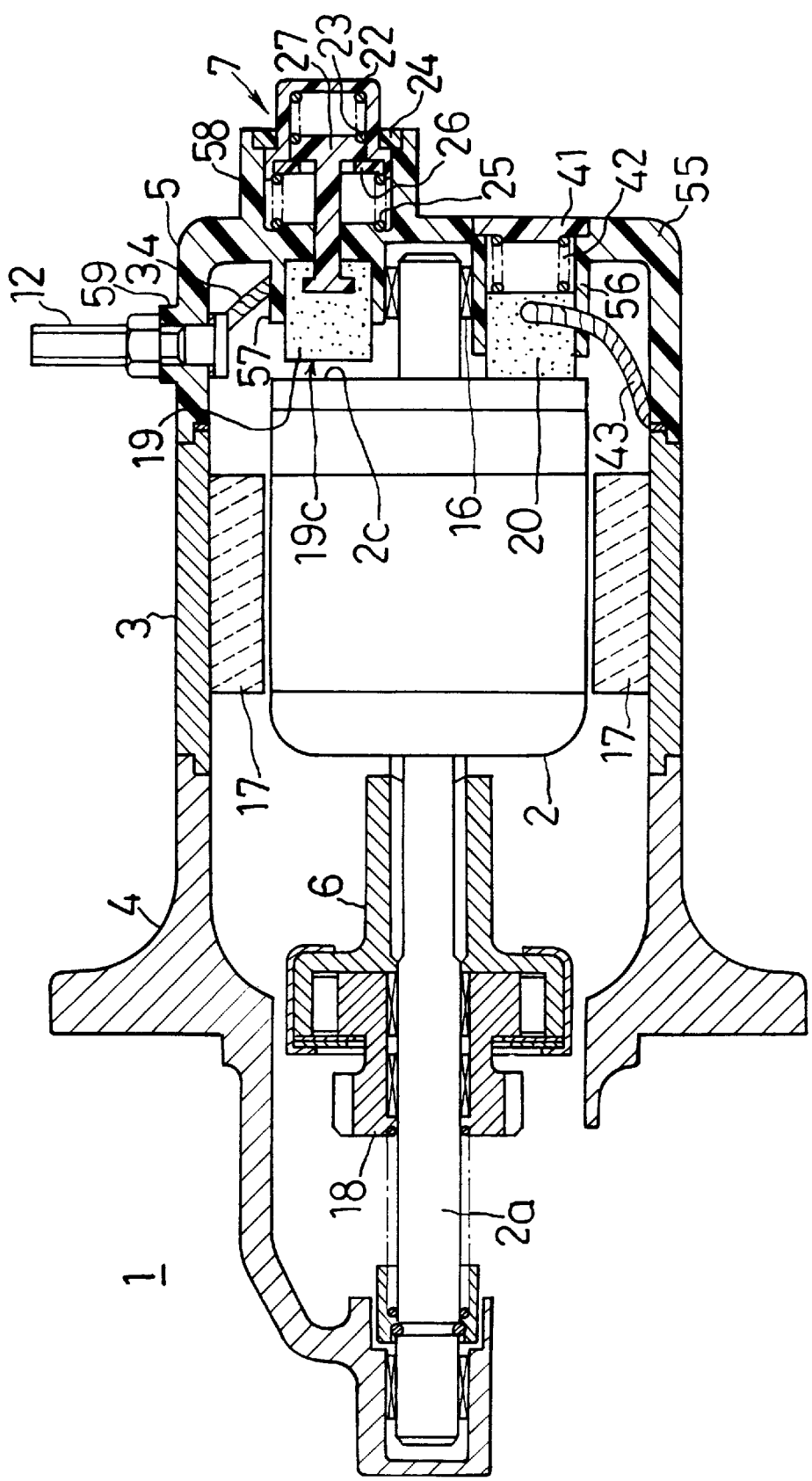
FIG. 11 is a side sectional view showing a starter according to a second embodiment of the invention.

As shown in FIG. 11, in a starter 1, a face type commutator 2c is formed at the axial rear end surface (right end surface) of an armature 2. Brushes 19 and 20 which contact the commutator 2c are held by an end frame 5.

That is, the end frame 5 is a one-piece member made of resin formed by monolithic molding and joined with the rear end of the yoke 3, thus rotatably supporting the rear end of the armature 2 at its radial center through a bearing 16. There are formed on the inner surface of a disc part 55 of the end frame 5 a brush-holding portion 56 holding a brush 20 and a brush-holding portion 57 holding a brush 19, respectively such that the brush 20 and the brush 19 are movable in the axial direction of the output shaft 2a.

The brush 20 is held by the brush-holding portion 56 and urged by the spring 42, thus being constantly in contact with the face type commutator 2c. The rear end of the spring 42 is in contact with the cover member 41 closing the brush-holding portion 56.

The brush 19 is held by a displacement member 7 comprising the brush-holding portion 57 and a cylindrical portion 58 formed at the rear thereof such that the brush 19 is movable by an operation which is performed externally.

The displacement member 7 comprises the brush-holding portion 57 and the cylindrical portion 58 both constituting a part of the end frame 50, the push button 22, the biasing spring 23, the rod-shaped member 27, the washers 24 and 26, and the return spring 25. The construction and operation of the displacement member 7 are similar to those of the first embodiment except that the brush-holding portion 57 and the cylindrical portion 58 are formed integrally with the end frame 5 by molding.

That is, the brush 19 serving as a switch contacts the face type commutator 2c only when the push button 22 of the displacement member 7 is depressed, whereas it separates from the face type commutator 2c when the operator releases the push button 22.

The starter 1 of the second embodiment provides the advantage similar to the starter 1 of the first embodiment. Further, the brush-holding portion 57 and the cylindrical portion 58 are formed integrally with the end frame 5 by molding. Therefore, the starter 1 of the second embodiment can be assembled at a low cost.

Modifications

In the second embodimentas well, similar modifications as the first and second modifications of the first embodiment can be made. That is, it is possible to allow the switching brush to be supported by the leaf spring 83, one end of which is held by the end frame 5 as shown in FIG. 9 or the leaf spring 83, both ends of which are held by the end frame 5 as shown in FIG. 10.

Third Embodiment

Figure 12:
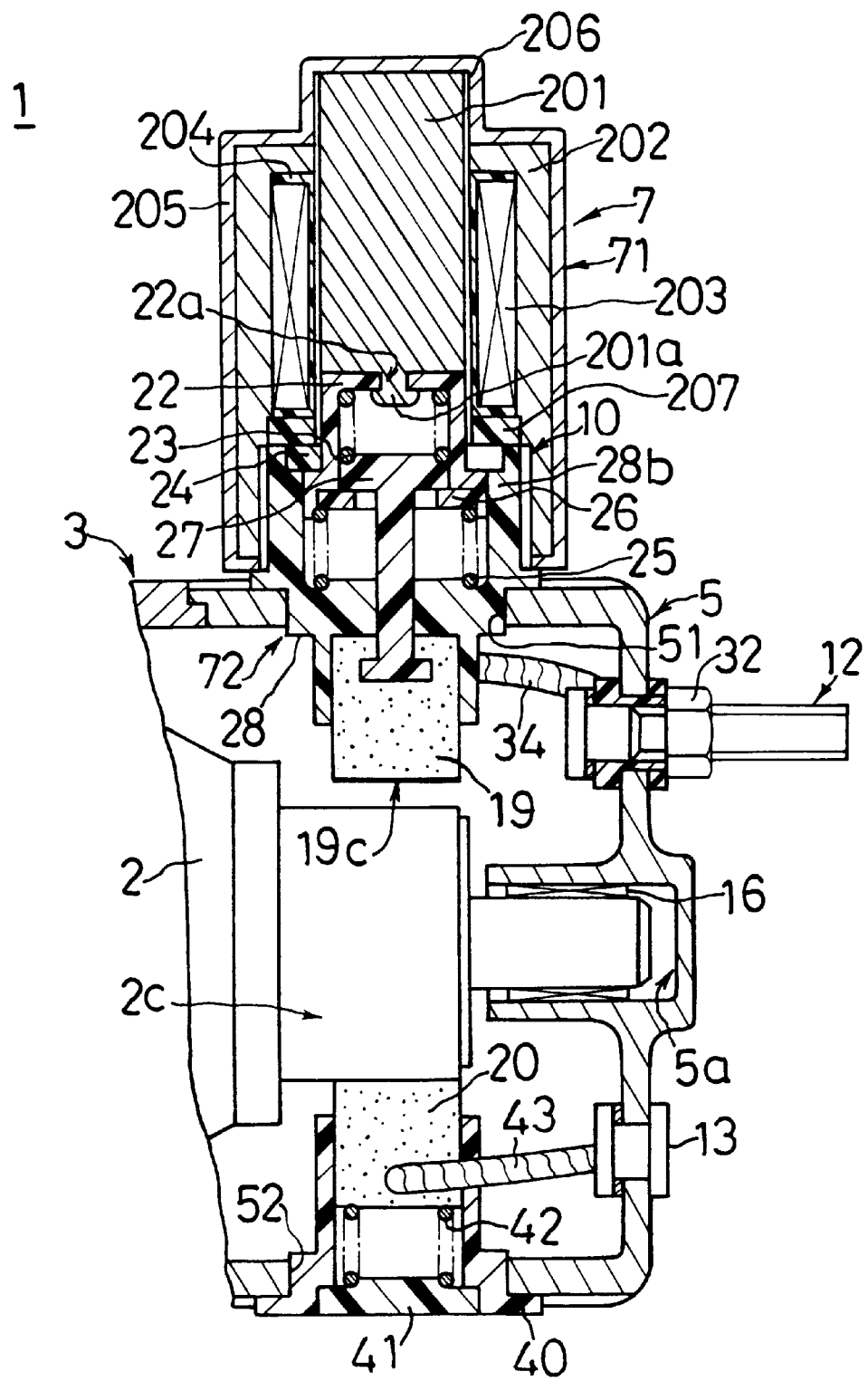
FIG. 12 is a side sectional view showing main parts of a starter according to a third embodiment of the invention.
Figure 13A:
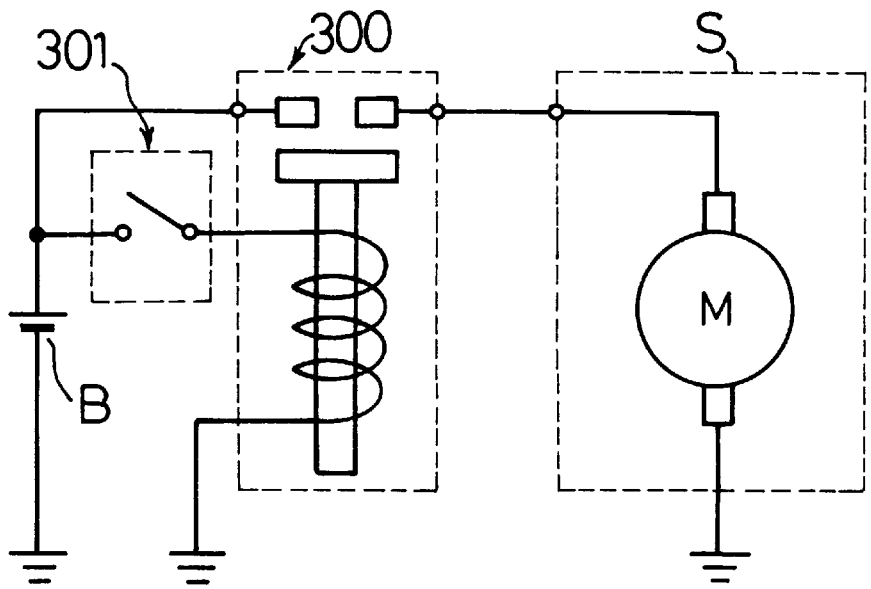
FIG. 13A is a circuit diagram showing a conventional starting circuit with an electromagnetic switch.
Figure 13B:
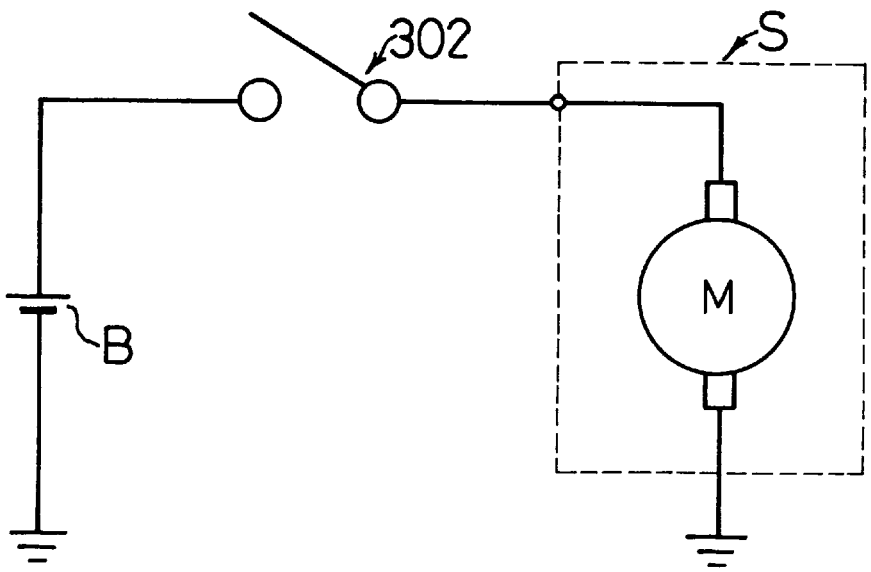
FIG. 13B is a circuit diagram showing a conventional starting circuit with a switch having a large capacity.

As shown in FIG. 12, in the third embodiment, the starter is modified to have a magnetic switch as the displacement member 7 so that a push button 22 can be operated by the displacement operation of a movable iron core 201 which is attracted by an electromagnetic coil 203.

The displacement member 7 comprises an actuator 71 having the movable iron core 201 and the electromagnetic coil 203 which moves the movable iron core 201 by attraction toward the inner side (downward in FIG. 12) when it is energized with electric current, and an intermediate displacement mechanism 72. The lower end of the movable iron core 201 of the actuator 71 is connected with the push button 22 of the intermediate displacement mechanism 72 so that the movable iron core 201 and the push button 22 are interlocked with each other.

The intermediate displacement mechanism 72 comprises a brush-holding member 28, the rod-shaped member 27, the return spring 25, the biasing spring 23, the push button 22, and the washers 23 and 26. Similarly to the first embodiment, the intermediate displacement member 72 engages the mounting hole 51 formed at the upper wall of the end frame 50, thus fixing the brush-holding member 28 to the end frame 50. The specification (size and shape) of a portion, of the brush-holding member 28, which engages the end frame 50 is the same as that of the brush-holding member 28 of the first embodiment. The intermediate displacement mechanism 72 is different from the displacement member 7 of the first embodiment in that in the intermediate displacement mechanism 72, a through-hole 22a is formed at the center of the push button 22 and that a male screw 10 is formed on the peripheral surface of the cylindrical portion 28b of the brush-holding member 28. The through-hole 22a and the male screw 10 are formed to enable the actuator 71 to be mounted on the brush-holding member 28.

The actuator 71 comprises the movable iron core 201, a frame 202, the electromagnetic coil 203, a bobbin 204, a cover 205, a sleeve 206 and a plate 207.

The frame 202 is a bottom-provided hollow cylindrical member formed of a soft magnetic material and constituting a part of the magnetic circuit of the actuator 71. A through-hole into which one end of the movable iron core 201 is inserted is formed at the bottom (upper part in FIG. 12) of the frame 202. The hollow cylindrical electromagnetic coil 203 wound on the bobbin 204 is accommodated in a space inside the frame 202 along the inner peripheral surface of the frame 202. The ring-shaped plate 207 made of a soft magnetic material is fixed to the inner peripheral surface of the frame 202, with the plate 207 in contact with one end of the bobbin 204. The magnetic circuit of the actuator 71 is constituted of the frame 202 and the movable iron core 201.

The cylindrical thin sleeve 206 made of a non-magnetic material, for example, Teflon resin having high sliding property is joined with the inner peripheral surface of the through-hole of the bobbin 204. The movable iron core 201 is held in the cylindrical space formed of the inner peripheral surface of the sleeve 206 such that the movable iron core 201 is vertically movable along the sleeve 206.

A projection 201a formed on the lower end of the movable iron core 201 is inserted into the through-hole 22a formed at the center of the upper end surface of the push button 22 and crushed and caulked to connect the movable iron core 201 and the push button 22 with each other.

The cover 205 made of resin covers the frame 202, the sleeve 206, and the bottom (upper end in FIG. 12) of the movable iron core 201, thus preventing dust, water or oil from penetrating into the vicinity of the movable iron core 201.

The actuator 71 having the above-described construction is fixed to the brush-holding member 28 by engaging a female screw formed at the lower end of the inner peripheral surface of the frame 202 with a male screw 10 formed on the peripheral surface of the brush-holding member 28.

In the starter 1 of the third embodiment, when the electromagnetic coil 203 is energized with electric current, the movable iron core 201 is attracted to the electromagnetic coil 203, thus biasing the push button 22 downward. As a result, the biasing spring 23 presses the rod-shaped member 27 downward. Because the lower end of the rod-shaped member 27 is in engagement with the brush 19 similarly to the first embodiment, the brush 19 interlocked with the movable iron core 201 is pressed against the commutator 2c.

The biasing force to be applied to the sliding-contact surface 19c of the brush 19 does not exceed an appropriate degree of force owing to the resilient force of the biasing spring 23. Thus, even though an excess impulsive force is generated by the movable iron core 201, the impulsive force is not transmitted to the sliding-contact surface 19c.

When the brush 19 interlocked with the movable iron core 201 is pressed against the commutator 2c due to the displacement of the actuator 71, the brush 19 is conductive with the commutator 2c.

To the contrary, when the electromagnetic coil 203 is not energized with electric current, the movable iron core 201 is returned to the original position (FIG. 12) by the resilient force of the return spring 25. At this time, because the brush 19 is interlocked with the movable iron core 201 through the rod-shaped member 27, the brush 19 separates from the commutator 2c, thus being nonconductive therewith and stopping the starter operation.

The starter 1 of the third embodiment has the following advantage in addition to that of the first embodiment.

That is, because the displacement member 7 comprising the actuator 71 and the intermediate displacement mechanism 72 is adopted, it is not necessary to provide the starter with a main switch having a large capacity which withstands the intensity of starting current. Therefore, the engine-starting system of the starter 1 has a simple construction, and thus can be manufactured at a low cost and reliably used.

Further, the starter 1 can be driven and stopped not manually but by a remote control, using a key switch even though it is used in an environment to which it is difficult for the operator to approach. Thus, it is safe and convenient to use the starter 1.

Further, because the specification of the brush-holding member 28 is the same as that of the brush-holding member 28 of the first embodiment, the displacement member 7 of the third embodiment and that of the first embodiment are replaceable with each other. Thus, it is possible to assemble, from many same parts, the starter 1 of the first embodiment in which a switching operation is manually performed and the starter 1 of the third embodiment in which a switching operation is electrically operated. Similarly, the displacement member 7 of the starter 1 in which a switching operation is manually performed can be replaced with the displacement member 7 of the third embodiment to modify the starter 1 into the starter 1 in which a switching operation is electromagnetically performed.

Modifications

It is possible to modify the third embodiment by changing the position of the displacement member 7 and the shape of the brush 19 in correspondence to various types of commutators.

Many other modifications to the above-described embodiments may be made without departing from the spirit and scope of the invention.

What is claimed is:

1. A starter comprising:

a motor frame;

an armature comprising a shaft and a commutator, said shaft having two shaft ends, said commutator being located at one of said two shaft ends, and said armature being accommodated and rotatably supported in said motor frame at said two shaft ends;

first and second brushes for contact with a sliding-contact surface of said commutator, one of said first and second brushes being electrically connected to a power source and another of said first and second brushes being electrically connected to ground, said first and second brushes collectively comprising a fixedly held brush fixedly held in contact with said sliding-contact surface and a movable brush movably held in relation to said sliding-contact surface; and a displacement member for displacing said movable brush from a contact position at which said movable brush is in contact with said sliding-contact surface to a separated position at which said movable brush is separated from said sliding-contact surface by a predetermined distance.

2. The starter according to claim 1, wherein said displacement member comprises:

a slide rail holding said movable brush so that said movable brush is movable throughout a predetermined range of positions along a displacement path intersecting said sliding-contact surface;

a return spring urging said movable brush by applying a return force to said movable brush along said displacement path away from said sliding-contact surface; and an external force-receiving member responsive to an external force to urge said movable brush toward being in contact with said sliding-contact surface.

3. The starter according to claim 2, wherein said displacement member comprises:

a brush-interlocking member connected to said movable brush; and a biasing spring having first and second biasing spring ends, said first biasing spring end being in contact with said external force-receiving member and said second biasing spring end biasing said movable brush toward being in contact with said sliding-contact surface by applying a biasing force through said brush-interlocking member to said movable brush, said biasing force being smaller than said return force, whereby when an external force is not applied to said external force-receiving member, said movable brush is urged away from being in contact with said sliding-contact surface.

4. The starter according to claim 1, wherein said displacement member comprises:

a leaf spring holding said movable brush in a movable position within a predetermined range of positions along a path intersecting said sliding-contact surface and comprising a resilient force biasing said movable brush toward a position in which said movable brush is separated from said sliding-contact surface; and an external force-receiving member urging said second brush toward being in contact with said sliding-contact surface when said external force-receiving member receives an external force, wherein said movable brush is held by said leaf spring so as to be movable along a path substantially perpendicular to said sliding-contact of surface.

5. The starter according to claim 1, wherein said displacement member comprises an external force-receiving member urging said movable brush toward a position in which said movable brush is in contact with said sliding-contact surface when said external force-receiving member receives an external force, and wherein said external force-receiving member comprises one of a push button, a push-pull knob, a lever, a stick, a rotary knob, and a dial, and is manually and externally operable.

6. The starter according to claim 1, wherein said displacement member comprises:
 a movable iron core interlocked with said movable brush;
 an electromagnetic coil attracting said movable iron core toward said electromagnetic coil by a magnetic attraction force when said electromagnetic coil is energized, thereby bringing said movable brush into contact with said sliding-contact surface; and
 a return spring fixed to said motor frame, said return spring urging said movable iron core toward a position at which said movable iron core is further away from said movable brush, thereby returning said movable iron core and said movable brush to respective default positions when said electromagnetic coil is not energized and thereby separating said movable brush from said sliding-contact surface.

7. The starter according to claim 1, wherein said movable brush comprises said second brush.

8. A starter comprising:
 a motor frame;
 an armature comprising a shaft and a commutator, said shaft having two shaft ends, said commutator being located at one of said two shaft ends, and said armature being accommodated and rotatably supported in said motor frame at said two shaft ends;
 a plurality of brushes for contact with a sliding-contact surface of said commutator, said plurality of brushes being electrically connected to a power source and collectively comprising a fixedly held brush being fixedly held in contact with said sliding-contact surface and a movable brush movable held in relation to said sliding-contact surface; and
 a displacement member for displacing said movable brush from a contact position at which said movable brush is in contact with said sliding-contact surface to a separated position at which said movable brush is separated from said sliding-contact surface by a predetermined distance, said displacement member comprising:
  a slide rail holding said movable brush so that said movable brush is movable throughout a predetermined range of positions along a displacement path intersecting said sliding-contact surface,
  a return spring urging said movable brush by applying a return force to said movable brush along said displacement path away from said sliding-contact surface,
  an external force-receiving member responsive to an external force to urge said movable brush toward being in contact with said sliding-contact surface,
  a brush interlocking member connected to said movable brush, and
  a biasing spring having first and second biasing spring ends, said first biasing spring end being in contact with said external force-receiving member and said second biasing spring end biasing said movable brush toward being in contact with said sliding-contact surface by applying a biasing force through said brush-interlocking member to said movable brush, each of said biasing force and said return force acting along said displacement path, and said biasing force having a magnitude smaller than a magnitude of said return force.

9. The starter according to claim 8, wherein said plurality of brushes comprise first and second brushes for contact with said sliding-contact surface, one of said first and second brushes being electrically connected to said power source and another one of said first and second brushes being connected to said ground.

10. A starter comprising:
 a motor frame;
 an armature comprising a shaft and a commutator, said shaft having two shaft ends, said commutator being located at one of said two shaft ends, and said armature being accommodated and rotatably supported in said motor frame at said two shaft ends;
 a plurality of brushes for contact with a sliding-contact surface of said commutator, at least one of said plurality of brushes being electrically connected to a power source; and
 a displacement member for displacing a movable one of said plurality of brushes from a contact position at which said movable one of said plurality of brushes is in contact with said sliding-contact surface to a separated position at which said movable one of said plurality of brushes is separated from said sliding-contact surface by a predetermined distance, said displacement member further comprising:
  an external force-receiving member urging said movable one of said plurality of brushes toward a position in which said movable one of said plurality of brushes is in contact with said sliding-contact surface when said external force-receiving member receives an external force, and wherein said force-receiving member comprises one of a push-button, a push-pull knob, a lever, a stick, a rotary knob, and a dial, and is manually and externally operable, said displacement member comprising a return spring for separating said movable one of said plurality of brushes away from said sliding-contact surface and pressing said movable one of said plurality of brushes to be in contact with said sliding-contact surface when said external force-receiving member is operated manually.

11. The starter according to claim 10, wherein said plurality of brushes comprise first and second brushes for contact with said sliding-contact surface of said commutator, said first brush being fixedly held in contact with said sliding-contact surface and said second brush being movable held, said select brush comprising said second brush.

12. The starter according to claim 10, wherein said biasing spring and said return spring share a common path of movement.

13. A starter comprising:
 a motor frame;
 an armature comprising a shaft and a commutator, said shaft having two shaft ends, said commutator being located at one of said two shaft ends, and said armature being accommodated and rotably supported in said motor frame at said two shaft ends;

first and second brushes for contact with a sliding-contact surface of said commutator, one of said first and second brushes being electrically connected to a power source and another of said first and second brushes being electrically connected to ground, said first and second brushes collectively comprising a fixedly held brush fixedly held in contact with said sliding-contact surface and a movable brush movably held in relation to said sliding-contact surface; and displacement means for displacing said movable brush from a contact position at which said movable brush is in contact with said sliding-contact surface to a separated position at which said movable brush is separated from said sliding-contact surface by a predetermined distance.

14. The starter according to claim 13, wherein said displacement means comprise:

means for holding said movable brush so that said movable brush is movable throughout a predetermined range of positions along a displacement path intersecting said sliding-contact surface;

returning means for urging said movable brush along said displacement path away from said sliding-contact surface; and force receiving means for receiving an external force to urge said movable brush toward being in contact with said sliding-contact surface.

* * * * *